(12) United States Patent
Mouchet et al.

(10) Patent No.: US 6,569,336 B1
(45) Date of Patent: May 27, 2003

(54) METHOD, DEVICE AND USE OF SAID METHOD FOR BIOLOGICAL ELIMINATION OF METAL ELEMENTS PRESENT IN AN IONIZED STATE IN WATER (75) Inventors: Pierre C. Mouchet, Rueil Malmaison (FR); Joan-Yves Bergel, Ville Saint Laurent (CA)

(73) Assignee: Degremont, Rueil Malmaison (FR)

( * ) Notice: Subject to any disclaimer, the term of this patent is extended or adjusted under 35 U.S.C. 154(b) by 0 days.

(21) Appl. No.: 09/959,960

(22) PCT Filed: Apr. 28, 2000

(86) PCT No.: PCT/FR00/01139

§ 371 (c)(1),
(2), (4) Date: Jan. 31, 2002

(87) PCT Pub. No.: WO00/69779

PCT Pub. Date: Nov. 23, 2000

(30) Foreign Application Priority Data

May 12, 1999 (FR) .............................. 99 06058

(51) Int. Cl.$^7$ .................................................. C02F 3/00
(52) U.S. Cl. ..................... 210/614; 210/743; 210/746; 210/220; 210/620
(58) Field of Search ............................... 210/746, 743, 210/620, 220, 614

(56) References Cited

FOREIGN PATENT DOCUMENTS

| DE | 1767738 | 3/1971 |
|---|---|---|
| DE | 17 67 738 A | 3/1971 |
| DE | 4111375 | 10/1992 |
| DE | 41 11 375 A | 10/1992 |
| DE | 42 31 363 A | 3/1994 |
| DE | 4231363 | 3/1994 |
| DE | 196 40 899 C | 1/1998 |
| DE | 19640899 | 1/1998 |
| EP | 0 695 720 A1 | 2/1996 |
| EP | 0 695 720 A | 2/1996 |
| FR | 2 470 094 A | 5/1981 |
| FR | 2470094 | 5/1981 |

OTHER PUBLICATIONS

Copy of US trademark registration application information for registration application Ser. 73/661833 (dead), (DEGREMONT SA, applicant), showing BIOLITE (design mark plus words, at http://tess.uspto.gov/bin/showfield?f=doc&state=p808h.2.11.*

* cited by examiner

Primary Examiner—Chester T. Barry
(74) Attorney, Agent, or Firm—Nixon & Vanderhye (57) ABSTRACT

The method, in which the water to be treated is partly oxygenated by a specific aeration carried out before percolation through a biofilter having a bacteria-supporting bed of filtering material, has a measurement stage of at least one parameter constituted by the oxidation-reduction potential of the aerated water before passage into the biofilter, a transmission stage of measurement signals to a computer and comparison of the signal representative of the value of the measured parameter with at least one lower limit set in function of the measurement carried out in a second stage for measuring a parameter representative of the pH and a stage for correcting the air flow by a signal determined by the computer in function of the two preceding stages.

17 Claims, 5 Drawing Sheets

METHOD, DEVICE AND USE OF SAID METHOD FOR BIOLOGICAL ELIMINATION OF METAL ELEMENTS PRESENT IN AN IONIZED STATE IN WATER

The present invention relates to a method for optimizing and monitoring automatically, by biochemical route, the elimination parameters of metallic elements present in the ionized state in water, for example ground or surface waters, the device for implementing said method and use of said method.

More particularly, the invention concerns a method and a device for elimination by biological route of divalent elements, such as divalent iron and manganese, present in groundwater.

The invention can be extended to surface waters devoid of dissolved oxygen where these elements are present in the same state, such as the reducing hypolimnion water above a dam in a state of eutrophication.

The oxidation of minerals by biological route has already been the object of in-depth studies and practical applications. This family of methods uses the capacity of certain specific bacterial strains, indigenous and/or incorporated, to catalyse by the exothermic oxidation reactions by enzymatic conversion. In return, these exothermic oxidation reactions provide the bacteria with the energy necessary for their development. This family of methods has been applied in particular in the mining industry for many years.:

either in the domain of extractive hydrometallurgy, whose first phases consist of pulverisation of the ore, enrichment by flotation and leaching in an acid or alkaline medium; biological leaching, or "bioleaching", often in competition now with purely chemical leaching. The most widespread applications have concerned, until recent years, the copper industry (see the work by N. N. Hughes & R. K. Poole: "Metals & Micro-organisms", published by Chapman & Hall, 1989, and the article by D. Morin: "Biotechnologies dans la métallurgie extractive", published in Les Techniques de l'Ingénieur, Paris 1995, No. M2238, vol. 1): the ore, more or less fractionated, is simply heaped in the open air and sprinkled with a solution of nutritive elements. This method, known under the name of "heap leaching", does not require any precise monitoring during the operation;

or for the treatment of acid effluents containing high amounts of dissolved divalent iron. The Japanese patent No. 44717/72 describes a method in which the culture of iron bacteria was carried out in a treated effluent, and then tipped into the effluent to be treated. In the Japanese patent No. 38 981/72, the method was improved by producing the bacterial culture 'in situ', on supports constituted of iron oxides. A further improvement was provided by the French patent No. 2.362.793, filed in 1976, where the bacterial culture was fixed on an insoluble support, at the pH of the effluent, and where the ferrous irons ($Fe^{2+}$) were oxidised by air blowing into an agitated reactor. The bacteria and their supports were then separated by decanting, then recycled in the reactor, as in a system for treating urban waste water by the activated sludge method. In such cases as well, control of the process does not pose any problem. In particular, the low pH level of the medium avoids any competition between the physico-chemical route and the biological route for iron oxidation, which in practice means absence of the need for monitoring the quantity of oxygen introduced and the quantity of residual oxygen in the water after treatment.

Later, it was considered that these phenomena could be applied to the elimination, by biological route, of the iron and manganese present in the dissolved state in natural water deprived of oxygen and whose pH value, contrary to the effluents mentioned above, is situated close to neutrality, roughly plus or minus one unit. In this field, even if it concerns species different from those characteristic of acid effluents, it was already known that bacteria capable of catalysing iron and/or manganese oxidation, still called ferro- and mangano-bacteria, could, thanks to exogenous enzymes and/or polymers, by detected in very diverse environments (groundwater, lake beds, emergent springs in marine bays, etc . . . ). The damage from ferro- or mangano-bacteria clogging up well drains or corroding metallic piping was already well known, these bacteria needed to be "domesticated" to make them work usefully in plants for eliminating dissolved iron and manganese.

The first observations on this subject were published by U. Hässelbarth & D. Ludemann (in the article "Die Biologische Enteisenung und Entmanganung", Vom Wasser, 1971, vol. 38, pp. 233–253; "Removal of iron and manganese from groundwater by microorganisms", Water Treatment & Examination, 1973, vol. 22, No. 1, pp. 62–77 and were concretised by the same authors filing the German patent No. 1.767.738. This patent describes a method for biological iron removal by oxygenation and filtration, under conditions such that the power of oxidation-reduction of the medium has a value rH higher than or equal to 14.5±0.5. The rH is an index analogous to the pH, representing quantitatively the value of the oxidising or reducing power of a medium. This rH value corresponds to the lower limit of the domain of action of ferro-bacteria. Thus a minimum condition was defined, but it only represented a threshold, moreover insufficient, for total iron removal and it did not make it possible to define the lower and upper limits on which to base the automatic regulation of the method.

Besides, the authors defined very limited and very restrictive oxygenation conditions for the method, probably because they did not have a variety of types of untreated water available. The development of this promising method was thus delayed.

At about the same time, similar studies were undertaken in France (P. Mouchet & J. Magnin: "Un cas complexe de déferrisation d'une eau souterraine", TSM-l'eau, 1979, vol. 74, No. 3, pp. 135–143), but for very differing waters, which made it possible for the French researchers to define more precisely the limits for biological iron removal and to provide, at the 1985 "Wasser Berlin" Congress, the construction of about thirty installations based on this principle of biological treatment (see the article of P. Mouchet et al. entitled "Elimination of iron and manganese contained in groundwater: classic problems, recent progress", published in Water Supply, 1985, vol. 3, No. 1, pp. 137–149). Besides, at the same time, the German researchers had noted that many plants could operate spontaneously on this principle (see the article by C. CZEKALLA et al. entitled "Quantitative removal of iron and manganese by microorganisms in rapid sand filters (in situ investigations)", published in Water Supply, 1985, vol. 3, No. 1, pp. 111–123). Moreover, similar observations had stimulated French research at the beginning of the seventies.

Thus from reading the above, one can note that biological iron removal was the method studied the most and the best known at the beginning of this research, probably because the natural seeding by indigenous bacteria is relatively rapid. On the contrary, the seeding time concerning biological manganese removal, a matter of several weeks, or even two or three months, did not encourage studies on manganese removal, at least to begin with.

Figure 4:
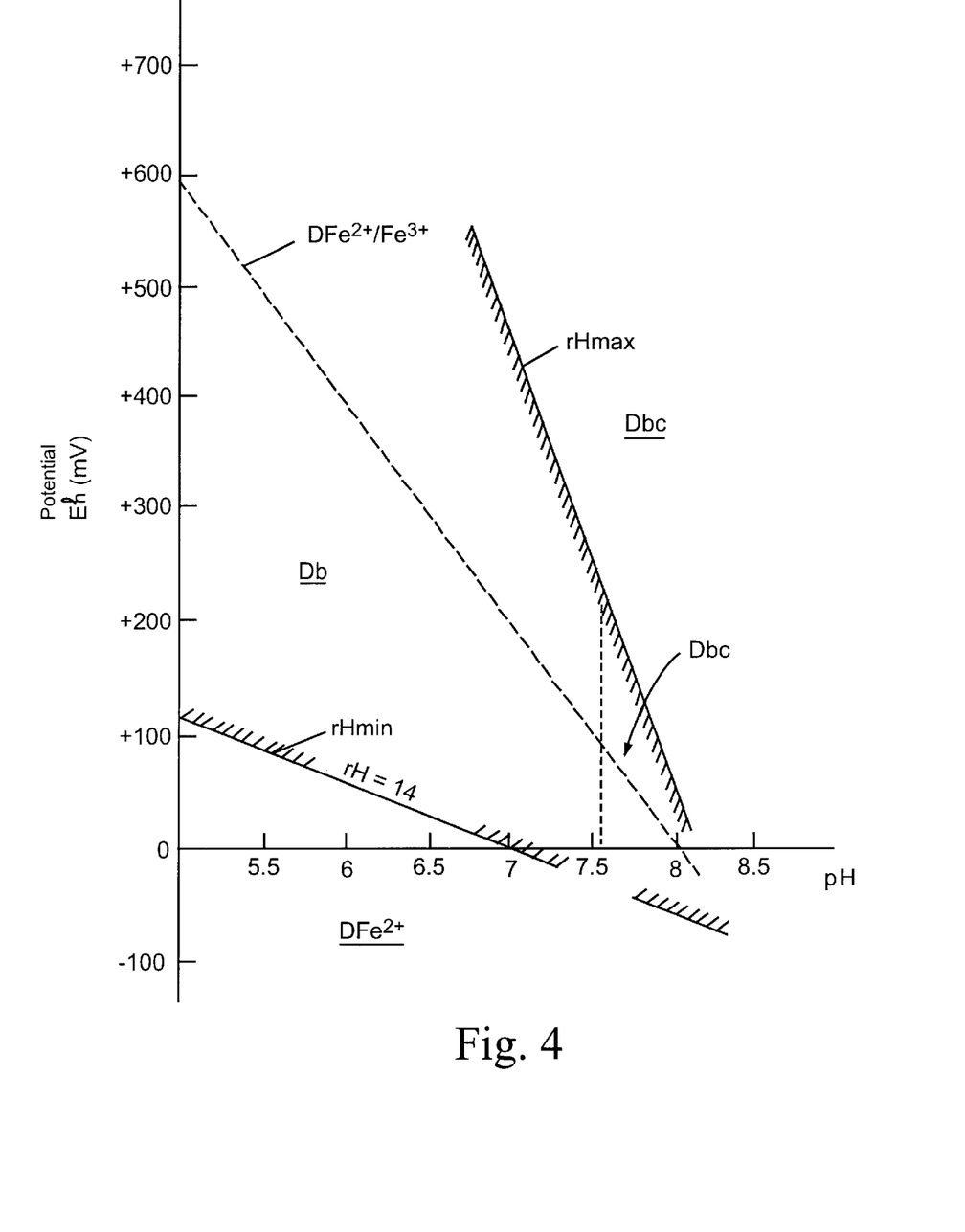
FIG. 4 shows a stability diagram of prior art illustrating the domain of activity of ferro-bacteria.

The results of French research, published in 1985, described among others the field of activity of ferro-bacteria, such as shown in FIG. 4, within which, moreover, the domain of existence of a treatment ensuring total iron elimination is submitted to more restrictive limits.

Such a diagram, drawn with ordinate the oxidation reduction potential and with abscissa the pH, is called a stability diagram. It was drawn up first by M. J. POURBAIX to study corrosion phenomena of ferrous metals, and was later extended to the speciation of the principal elements (see the works of M. J. Pourbaix entitled "Atlas d'equilibres électrochimiques à 25° C.", published by Gauthier-Villars, Paris 1963, pp 307–321) and applied to the study of iron removal from groundwater (see article by J. D. Hem, entitled "Stability field diagrams as aids in iron chemistry studies", published in the AWWA Journal, 1961, Vol. 53, No. 2, pp. 211–232).

The domain of biological iron removal (Db) or ferro-bacterial activity is defined by a minimum rH value and a maximum rH value, the zone comprised below the curve (rHmin) representing the minimum rH value corresponding to the stability domain (DFe$^{2+}$) of the ferrous ion and the zone comprised above the curve (rHmax) representing the maximum rH corresponding to the domain (Dpc) of physico-chemical iron removal. The optimum domain for biological iron removal (Db) overlaps the theoretical limit (DFe$^{2+}$/Fe$^{3+}$) separating the respective domains of the ferrous iron and the ferric hydroxide.

The diagram in FIG. 4 shows that biological iron removal from natural water, whose pH can vary from values lower than 6 up to values higher than 8, can only be produced under certain conditions of oxidation-reduction potential and pH for which there is enzymatic oxidation of the ferrous ions Fe$^{2+}$ without precipitation of basic salts of ferric iron Fe$^{3+}$, that is without production of physico-chemical iron removal whose performances are much more modest than those of biological iron removal.

In the water before treatment, the oxidation-reduction potential (or Eh) varies in function of the concentration of oxygen dissolved brought by aeration, whereas in treated water the Eh depends more on the value of the Fe$^{3+}$/Fe$^{2+}$ couple, that is to say the degree of iron oxidation. In FIG. 4, it can be clearly seen that the oxidation conditions must be more closely monitored as the pH rises. In particular, when the pH is greater than 7.6 in untreated water, the level of oxygen dissolved must be lower than a maximum threshold, very limited, the exact upper limit being lowered as the pH rises. This pH value is comprised between 7.6 and 8.5 defining a domain (Dbc) where the iron removal is difficult to adjust because of the competition between the biological oxidation and the physico-chemical oxidation.

Figure 5:
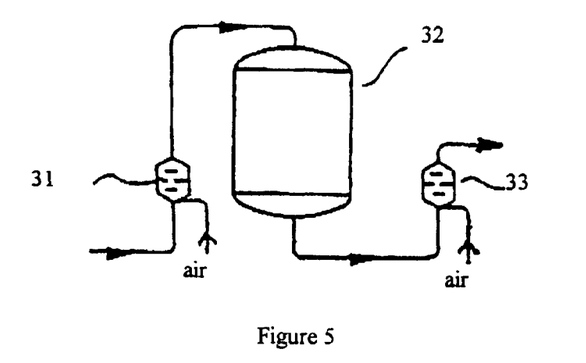
FIG. 5 shows a device for biological iron removal of prior art.

Since a level of oxygen dissolved at a concentration higher than 50% of saturation point is nonetheless desirable in treated water, in particular to avoid fermentation and corrosion during distribution, these observations have led to the concept of biological iron removal plants, for all waters at pH>7, following the diagram of FIG. 5. In this design, untreated water undergoes a first aeration carried out in a mixer 31, specially studied to obtain an immediate mixture of air and water. The water is then submitted to biological iron removal by high-speed percolation through a bed of specific filtering material, a ferro-bacteria support in a biofilter reactor 32 studied specially for this. The filtered water is then submitted to a final intensive aeration in a new mixer 33. The filter bed is made of a material marketed under the brand name Biolite®.

The necessity for perfect control of the quantity of oxygen injected for all waters with pH>7.3 led to the French patent No. 2. 470.094, filed in 1979 by the Applicant. This patent describes an invention according to which the oxygen was introduced into the water to be treated by recycling part of the treated water. This treated water was previously brought close to saturation in dissolved oxygen through a final intensive aeration, the quantity of oxygenated recycled water being a function of the pH of the water to be treated and its oxygen requirements, and adjusted using a rotameter or other apparatus for measuring flow.

Figure 6:
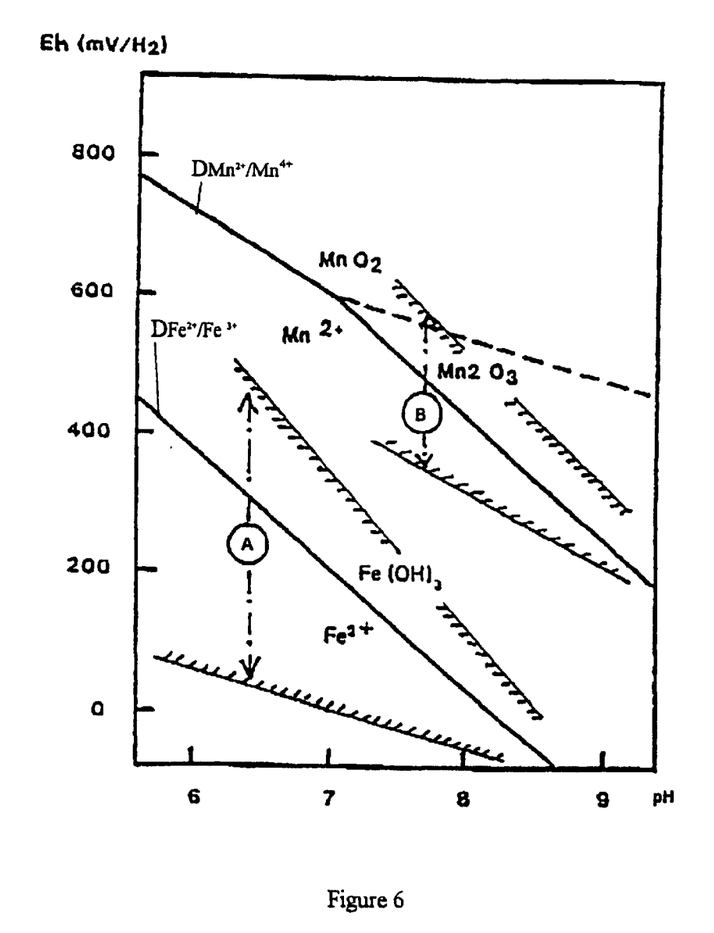
FIG. 6 shows the biological iron removal and manganese removal domains defined by prior art.

Continuing research in France then made it possible to set the limits of the domain for biological manganese removal and to compare them with those of biological iron removal. FIG. 6 shows that the two domains are separate and that there is no common point between the zone (A) of the biological route for iron removal, overlapping the theoretical limit (DFe$^{2+}$/Fe$^{3+}$) separating the respective domains of the ferrous ion and ferric hydroxide, and zone (B) of the biological route for manganese removal overlapping the theoretical limit (DMn$^{2+}$/Mn$^{4+}$) separating the respective domains of the Mn$^{2+}$ ion and manganese dioxide (MnO$_2$).

The result is that for water containing the two elements together, the solution generally adopted is treatment in two filtration stages, described in the article by P. Mouchet "From conventional to biological removal of iron and manganese in France", published in the Journal AWWA, 1992, vol. 84, No. 4, pp. 158–167, a first for iron removal and a second for manganese removal, each stage specifically receiving its own adjustments of oxygen injection and, if required, adjustment of the pH.

This know-how represents the prior state of the art, before the present invention, from which it is clear that for correct running of a treatment plant for iron removal and, if necessary, manganese removal by biological route, the surrounding conditions in the treatment medium must be adjusted continually, in order to avoid any inhibition of bacterial activity. These conditions depend on a certain number of parameters, such as the pH, the oxidation-reduction potential, the temperature, the substrate concentrations, the element to be oxidised, and oxygen.

Any fault in adjustment or operation of the oxygen-supply and/or pH correction devices leads to malfunction of the treatment unit, resulting in a lowering of the oxidation efficiency of the element to be oxidised. Nonetheless, biological elimination has many advantages over conventional physico-chemical treatment:

higher quality of treated water,
compactness of treatment plants,
higher treatment speed,
absence of reactive agents (flocculants, oxidants),
loss of charges reduced,
significant reduction of investment and running costs,
better production yields of dehydration of sludge, enough significant advantages to be a real incentive to overcome the defects and malfunctions mentioned above.

In the domain of biological iron removal, said defects and malfunctions can arise from:

either a lack of oxygen, which would limit the respiration needs of the biomass, and would situate the water at a level of low oxidation-reduction potential;

or an excess of oxygen, which would situate the water at a level of too high oxidation-reduction potential, and would inhibit microbe activity. These conditions could even create competition between physico-chemical oxidation and bacterial activity;

or too low an acid pH (less than 6 to 6.5) which would situate the water under the minimum threshold for oxidation-reduction potential (Eh), required for microorganisms to react to provide total oxidation of the element to be eliminated;

or, finally, too high a basic pH (over 7.8 to 8) which would situate the water above the maximum threshold for oxidation-reduction potential, encouraging competition between chemical oxidation of the element to be oxidised and bacterial activity, even going as far as inhibiting this bacterial activity.

On the other hand, biological manganese removal is less sensitive to the medium parameters, although it is nevertheless useful to ensure permanently that, before entering the manganese removal reactor, the water to be treated has a sufficiently high pH (greater than about 7.2) and a content of dissolved oxygen greater than 50–60% saturation to be in the domain (B) defined in FIG. 6. The control of these biological treatments therefore rests on that of the operational physico-chemical parameters, which is not easy for small plants and when the oxygen content ($O_2$) dissolved has to be very low for the process (sometimes less than 1.0 mg/l for biological iron removal from waters with pH higher than 7.5). The present invention solves this type of problem by providing a method for regulating the process in function of the characteristics of the raw water.

It can be noted that a similar philosophy for biological processes has also appeared in other domains, for example:

for anaerobic treatment of waste water (see patent FR 2 672 583 or U.S. Pat. No. 5,248,423, filed by the Applicant in 1992).

for extractive hydrometallurgy, for biofiltration of metals more rare and more precious than copper, for example gold, (see the article by A. Kontopoulos & M. Stefanakis, "Process options for refractory sulfide gold ores: technical, environmental and economical aspects", 1991, 393; the article by J. Libaude, "Le traitement des minerais d'or" published in Recherche, May 1994) or cobalt (see the article by D. Morin et al. "Study of the bioleaching of a cobaltiferrous pyritic concentrate", published in IBS proceedings, 1993, vol. 1, p. 147; the article by D. Morin "Des bactéries vont extraire le cobalt", published in Recherche, 1998, No. 312, pp. 38–40). It should be noted that the gangue, from which these metals are extracted, is often constituted mainly of pyrite, which here again implies a major action of ferro-bacteria adapted to acid media, already mentioned above relative to the treatment of acid effluents from mines.

Nonetheless, the invention described here has no point in common with the above domains, where for example the composition of methane-containing gas intervenes, on the flow of raw water under anaerobic treatment of effluent, or a process for bioleaching is controlled by reactor hydraulics, the introduction of adapted bacterial strains and/or the adjustment of the temperature.

In the present case, the conditions of oxidation of raw water will primarily be adjusted automatically as a function of the characteristics of the raw water, the aerated water before treatment and/or the final treated water. A first approach to this type of regulation was tried out on the bases of the Eh potential of the water treated (see the article by C. Tremblay et al., "Control of biological iron removal from drinking water using ORP", published in IAWO, Vancouver, 1998, June) similar to other devices studied for treating waste water (see the article by J. Charpentier et al, "Oxidation-reduction potential (ORP) regulation: A way to optimize pollution removal and energy savings in the low load activated sludge process", published in Water Sci. Tech., 1987, vol. 19, No. 3–4, pp. 645–656; and the article by D. G. Warcham et al, "Real-time control of wastewater treatment systems using ORP", published in Wat. Sci. Tech., 1993, vol. 28, No. 11–12, pp. 273–282). The tests based on this principle, carried out by the Applicant, resulted in failure.

In fact, in treated waste water, the final oxidisation-reduction potential Eh takes into account the transformation of carbonaceous, nitrogenous, phosphorated, sulphurated etc. species, of which only a fraction can be eliminated from the water by stripping or stocking in bacteria: a fraction of these compounds therefore remains dissolved, under a partly reduced/partly oxidised form, and the final potential depends on the respective proportions of the two forms of the oxidation-reduction system.

On the other hand, as far as iron and manganese removal are concerned, the reduced forms of the metals are oxidised and precipitated, thus quasi-eliminated from the dissolved matrix. For a given pH, the final oxidation-reduction potential Eh is representative of this elimination, whether it takes place by physico-chemical or biological route. Furthermore, it is independent of the content of dissolved oxygen, since the normal potential of the $O_2/H_2O$ couple is very much lower than that of the $Fe^{3+}/Fe^{2+}$ couple. Measurement of the Eh of treated water thus has a certain interest as a parameter indicative of the efficiency of the treatment, which has moreover been demonstrated by the authors quoted above, who were able to establish a significant relationship between this value and the residual iron content in the filtered water. On the other hand, in no case can this measurement serve as a basis for regulating the process.

The aim of the present invention is to propose a process making it possible to avoid such risks and to regulate a treatment for biological elimination of elements present under ionized form.

This aim can be attained through the fact that the elimination process, by biological route, for metallic elements present in the ionized state in waters devoid of dissolved oxygen, in which the water to be treated is partially oxidised by a specific aeration carried out before percolation through a biofilter reactor including a bacteria-supporting bed of filtering material, is characterised in that it comprises:

a measurement stage for at least one parameter constituted by the oxidation-reduction potential (Eh) of the aerated water before passage into the biofilter;

a transmission stage of measurement signals to a computer and comparison with the signal representative of the value of at least one parameter measured for at least one lower limit of this parameter determined in function of the measurement carried out in a second stage of measurement of a second parameter representative of the pH and a possible stage of correction of the air flow by control by a unit for adjusting the air flow by a signal determined by the computer in function of the two preceding stages.

According to another characteristic, the process comprises a stage for measuring the second parameter constituted by the pH of the aerated water before passing into the biofilter, a stage of comparison with a lower and higher limit of the first parameter whose lower and higher limits are determined in function of the measurement of the second parameter.

According to another characteristic, the process comprises a stage for compensation of a fault in the regulation of the air flow by the first parameter by means of a system of complementary regulation using at least one signal provided by a means of measurement of the residual content of oxygen dissolved in the treated water.

According to another characteristic, the compensation stage uses a second signal provided by means of measurement of the pH of the treated water simultaneously with measurement of the dissolved oxygen.

According to another particularity, the process comprises a stage for regulation of the pH of the filtered water by injection of an alkaline solution into the water to be treated; if the signal provided by means of the measurement of the pH and representative of the value of the pH of the water treated is lower than a fixed lower value, said injection being limited by a fixed higher set value of the pH.

According to another particularity, the process comprises a stage for verification of the efficiency of the treatment by continuous measurement of the residual dissolved iron content and oxidation-reduction potential of the filtered water, with an alarm being set off in the event of an anomaly.

Another aim of the invention is to propose a device for elimination of elements present under ionized form in ground water or surface water.

This aim is attained by the fact that the device for the treatment of water devoid of dissolved oxygen according to the invention is characterised in that it comprises an aeration chamber into which the raw water and injected air are introduced, whose flow is adjusted by a valve allowing controlled aeration under pressure and whose outlet is linked to a biofilter reactor, provided with an exit, with a porous ferro-bacteria supporting bed through which the water to be treated percolates, first pH measurement means and second oxidation-reduction potential measurement means of the aerated water, set between the entrance chamber and the filter, calculating units taking into account the signals delivered by the first and second measurement means to deliver a command signal to a means for adjusting the air flow acting on the valve to enable regulation in function of an upper and lower limit of Eh potential, determined for a given pH value.

According to another characteristic, the device comprises pH measurement means and means for measuring the dissolved oxygen at the exit from the filter and units for calculating and regulating the air flow to allow complementary regulation of the process.

According to another characteristic, the device comprises a pH regulation station comprising a reservoir of alkaline solution controlled by an electro-valve or a feed pump which is monitored by the signal worked out by a regulation unit and allowing regulation of the pH in function of the signal delivered by the pH measurement means set at the exit from the biofilter reactor to the regulation unit.

According to another particularity, the device comprises means for measuring the oxidation-reduction potential of residual iron in the filtered water, set at the exit from the filter and enabling evaluation of the efficiency of the device.

According to another particularity, the exit from the biofilter reactor with ferro-bacteria is linked to the entry of a second aeration chamber in which the treated water is sent from the biofilter reactor with ferro-bacteria and air injected by a second valve, the exit from the aeration chamber being linked to a second biofilter reactor provided with an exit and lined with a porous mangano-bacteria supporting bed through which the treated water coming from the ferro-bacteria biofilter filters and third measurement means of oxidation-reduction potential at the exit from the second aeration chamber, a computing unit taking into account the signal delivered by the third measurement means to deliver a command signal to a means of regulation acting on the second valve to allow regulation of the air flow in function of a given lower limit.

According to another characteristic, the filter bed is constituted of siliceous sand of effective size between 1 and 3 mm.

According to another characteristic, the filter bed is constituted of a filtering material, called "Biolite", specially designed for this type of treatment.

Another aim of the invention is to propose a utilisation for said process.

This aim is attained in that the process is used in a biofilter with a ferro-bacteria supporting bed of filtering material.

According to another characteristic, the process is used in a biofilter with a mangano-bacteria supporting bed of filtering material.

According to another characteristic, the process is used in a biofilter with an autotrophic bacteria supporting bed of filtering material.

According to another characteristic, the process is used in a first biofilter with a ferro-bacteria supporting bed of filtering material, and then the treated water exiting from this first biofilter is used in a second biofilter with a mangano-bacteria supporting bed of filtering material.

Other characteristics and advantages of the present invention will become clear by reading the description below referring to the attached drawings in which.

The invention will now be described with reference to the figures.

Figure 1:
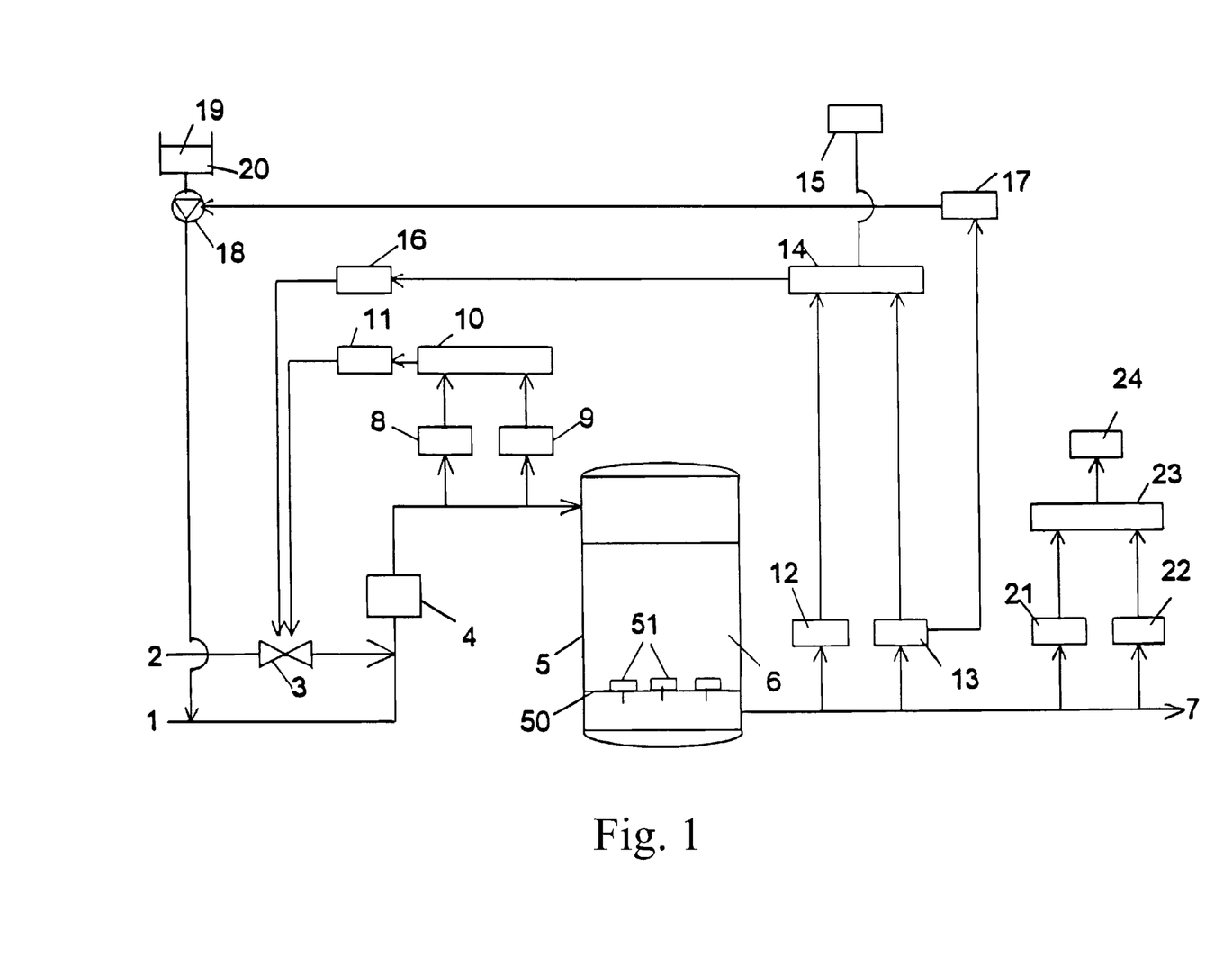
FIG. 1 shows a diagram of a device, according to the invention, for iron removal from ground water.

The process consists of measuring the following parameters: the pH and oxidation-reduction potential, on previously aerated water, and possibly the pH and/or dissolved oxygen on the water treated by the biomass. From these measurements and in real time the monitoring unit acts on different adjustment mechanisms in order to adjust the operational conditions best adapted to the correct operation of the ecosystem in the reactor where the biological reaction takes place with the biomass. These control units are such as indicated in FIG. 1, which is only one embodiment of a device enabling implementation of the process according to the invention, given as a non-limiting example and detailed as follows.

The raw water, still called water to be treated, is carried by piping 1, to which an air injection piping 2 is connected. An automatic valve 3 regulates the flow of the latter; the water is immediately mixed thoroughly with the introduced air, passing into an aeration chamber or mixer 4, and then penetrates into a biofilter reactor 5, filled with a specific filtering material 6, called a filter bed, resting on a flooring 50 provided with a plurality of nozzles 51. The filter bed can be constituted of siliceous sand of effective size between 1 and 3 millimetres, or of porous material designed specially for biofiltration, of the type on sale under the brand name "Biolite". After treatment, the effluent exits from the biofilter 5 through the piping 7 for treated water, connected below the flooring 50. On the raw water piping 1, downstream from the mixer 4, a sensor-analyser assembly 8 constitutes a first measurement means of the pH of the aerated water, whereas an analogous apparatus 9 constitutes a second means for measuring the oxidation-reduction potential (Eh) of the aerated water. The signals representing the results of the two analyses are transmitted to a computer 10 which checks that the value of the Eh potential is really between a minimum (lower limit) and a maximum (upper limit) determined in function of the pH value of raw water. If this is not the case, the computer 10 sends a signal to a regulator 11 which provides the order to increase or reduce the air flow delivered by the valve 3 depending on whether the value of the Eh potential of the aerated water is below the lower limit or above the upper limit respectively.

Thus, as described above, the specific filtering material is constituted either of sand, or of a "Biolite" type material of effective size higher than the order of 1 to 3 mm, such as for example 1.25 mm, that is greater by 50% than the effective size of 0.95 to 0.75 mm of the same filters used under conditions not corresponding to iron removal and manganese removal conditions. In the same way, the nozzles 51 of the flooring of the biofilter reactors can comprise wider slits of the order of 0.7 to 1.2 mm whereas formerly, the slits had a size of 0.4 mm. The filtration speed is of the order of 30 to 50 m/sec.

Finally, the oxygenation created by the regulation will generate the development of bacteria within the filter, these bacteria being ferro-bacteria or mangano-bacteria according to the specific aeration conditions created upstream of the filter. The effective size of the filtering bed and the nozzle slits makes it possible, taking into account the lower size of the bacteria, to avoid obstruction of the filtering bed and the nozzles and above all to wash the raw water filter bed, when the passage speed of water in the filter exceeds the filtration speed.

A precision adjustment, complementary to the main adjustment of the process described above, is ensured by control units located downstream from the biofilter 5. The exit 7 for filtered water is provided with a measurement means 12 for residual dissolved oxygen and a second measurement means 13 for the pH. The signals representative of the measurements are sent to a calculation unit or a computer 14 which verifies that the signal representative of the content of dissolved oxygen, for the pH values measured, is neither below a given lower threshold, for the pH value measured, due to consumption of part of the oxygen introduced ahead during iron oxidation, nor above a given upper threshold, resulting from a possible lack of precision of the regulation of air flow resulting from the Eh potential measurement of aerated water. To begin with, overrunning one of these thresholds detected by the computer 14 can set off an alarm 15 which will alert the operator to verify the upstream regulation (through the Eh potential value of aerated water) and if necessary to adjust the values of orders sent to the computer. After this, if optimisation of upstream regulation of the biofilter is impossible, this will be replaced by a downstream regulation through dissolved oxygen, carried out by a signal emitted by the computer 14 to a regulator 16 which sends, depending on the case, a signal to open or close the air entry valve 3 to return within the set limits.

Furthermore, it must be remembered that the iron oxidation and precipitation reactions freeing protons $H^+$, are acidifying. If the buffering capacity of the raw water is low, corresponding to low alkalinity, during the process the pH risks undergoing a drop incompatible with good treatment yield. The device according the invention comprises a pH regulation station making it possible to avoid this drop in pH. In order to eliminate this disadvantage, the process according to the invention envisages sending the result of the pH measurement provided by the second measurement means 13 to a regulation unit 17 which starts, if the pH descends below a certain set point (lower threshold), the progressive operation of an electro-valve or a feed pump 18 which introduces into the piping 1 an alkaline solution 19 contained in a preparation tank or reservoir 20, without the water pH going beyond the upper set limit (upper threshold), compared with the pH measurement provided by the measurement means 8 or the measurement means 13. The lower and upper pH thresholds are decided in function of the nature of the bacteria used, each bacterium having a preferential pH range.

The lower and upper limits attributed respectively to the oxidation-reduction potential Eh of the aerated water and to the concentration in dissolved oxygen of the treated water are deduced by simple algorithms whose independent variable is the pH of the corresponding water and which are stored in the memory of the computer ad hoc.

The algorithms used correspond to:
the upper and lower limits of the Eh oxidation-reduction potential of the aerated water, characterised by an equation of the form $$Eh = \alpha - \beta * pH$$

the upper and lower limits of the oxygen concentration [$O_2$] of the treated water (for a pH equal to or greater than 7), characterised by an equation of the form $$\log [O_2] = \gamma - \delta * pH$$

expression in which the coefficients $\alpha$, $\beta$, $\gamma$, and $\delta$ are determined case by case for each type of water.

In order to evaluate the treatment efficiency, the piping 7 for treated water, downstream from the biofilter 5, can be provided with a sensor-analyser unit 21 measuring the oxidation-reduction potential Eh of the treated water and a sensor-analyser assembly 22 measuring its residual iron content. These assemblies are connected to a computer 23 which can set off an alarm 24 if there is an anomaly. This embodiment is given as a non-limiting example. The different computers, 10, 14, 23, mentioned above can form a single component capable of integrating the different signals emitted by the sensors 8, 9, 12, 13, 21, 22, and able to command a single air flow regulator. This component can also comprise the pH regulator 17.

In the above, the application of the invention as described in FIG. 1 referred first and foremost to a biological iron removal treatment. The invention can regulate any other biological treatment based on oxidation by air, in particular biological manganese removal. The algorithms are then less complex, since it is sufficient to ensure that the fundamental physico-chemical parameters of the process (potential, dissolved oxygen, possibly rH) are all well located above a certain set point, without it being necessary to take into consideration an upper limiting value, whatever the parameter under consideration.

Figure 2:
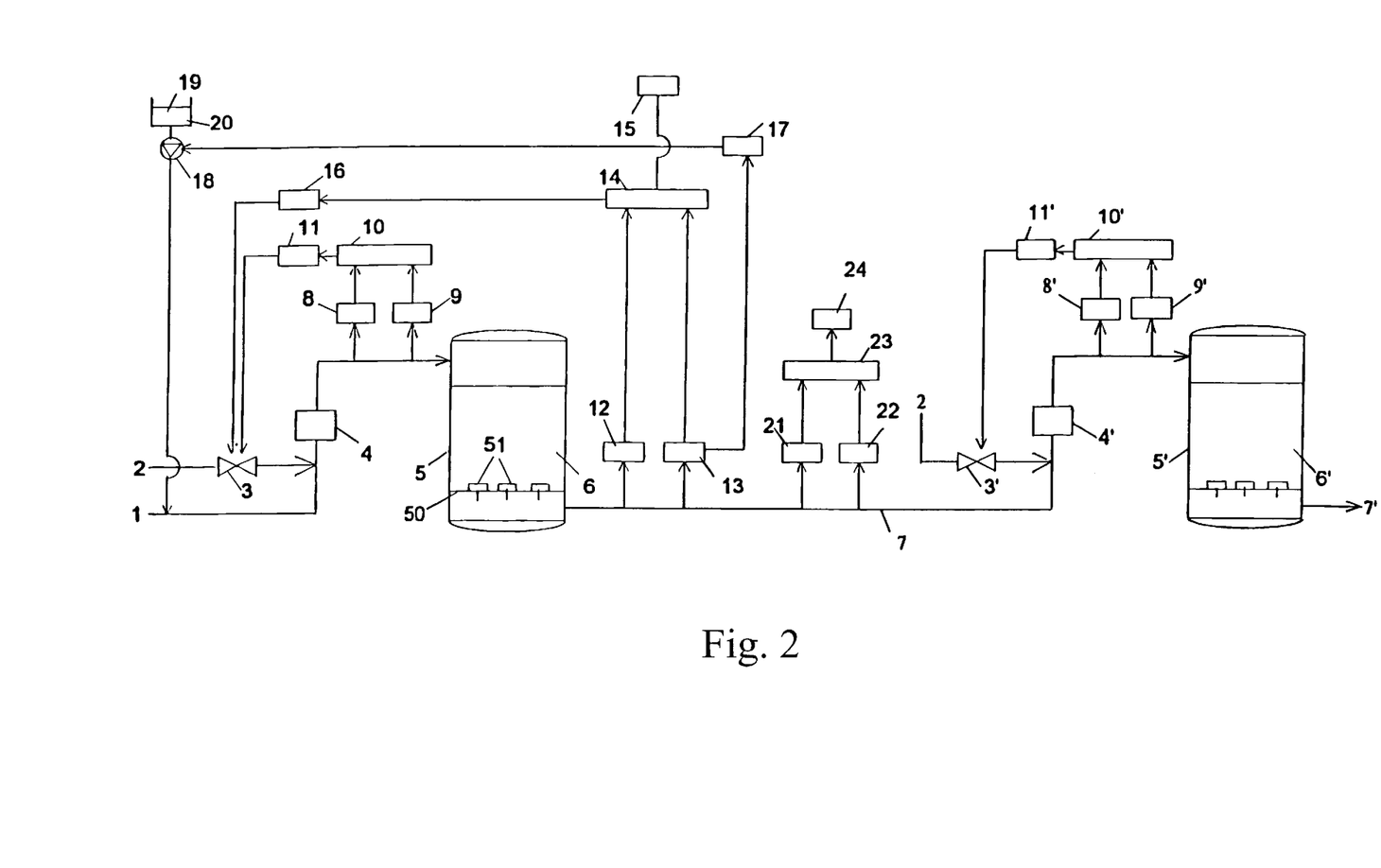
FIG. 2 shows an iron removal and manganese removal device for water according to the invention.

In the same way, in another variant shown in FIG. 2, it is possible to put a device for iron removal according to the invention in series with a downstream device for manganese removal. The exit 7 from the ferro-bacteria biofilter reactor 5 is linked directly or indirectly to the entrance to a second aeration chamber 4' into which the treated water from the ferro-bacteria biofilter reactor arrives together with the air 2 injected by a second valve 3'. The water is then treated by percolation through a second biofilter reactor 5' provided with an exit 7' and comprising a porous mangano-bacteria supporting bed 6'. Third measurement means 9' of Eh oxidation-reduction potential or dissolved oxygen and measurement means 8' of pH are set at the exit from the second aeration chamber. The representative measurement signals are sent to a computer 10' which compares the representative signal of the potential measured with a lower limit given as a function of the representative signal of the pH measurement. If the measured potential is lower than the lower limit, the computer 10' delivers a command signal to a regulation means 11' acting on the second valve 3' to enable adjustment of the air flow. It is to be noted that the computer 10' can use the pH measurement of the water treated by the iron removal device, made by the sensor 8 or the second measurement means 13 described above. The water exiting from the ferro-bacteria biofilter reactor can if necessary undergo special treatments before being treated by the manganese removal device.

The invention has been applied as a pilot station to the treatment and elimination of iron and manganese in ground water. The installation comprises two filtration steps operating according to the process according to the invention, one adjusted for iron removal and the second adjusted for manganese removal. The results are given in the table below, and demonstrate the low concentration of iron and manganese in water treated by the process according to the invention.

| PARAMETERS | RAW WATER | TREATED WATER |
|---|---|---|
| pH | 7.0 | 7.8 |
| Fe (mg/l) | 13 | <0.1 |
| Mn (mg/l) | 2 | <0.04 |

Figure 3:
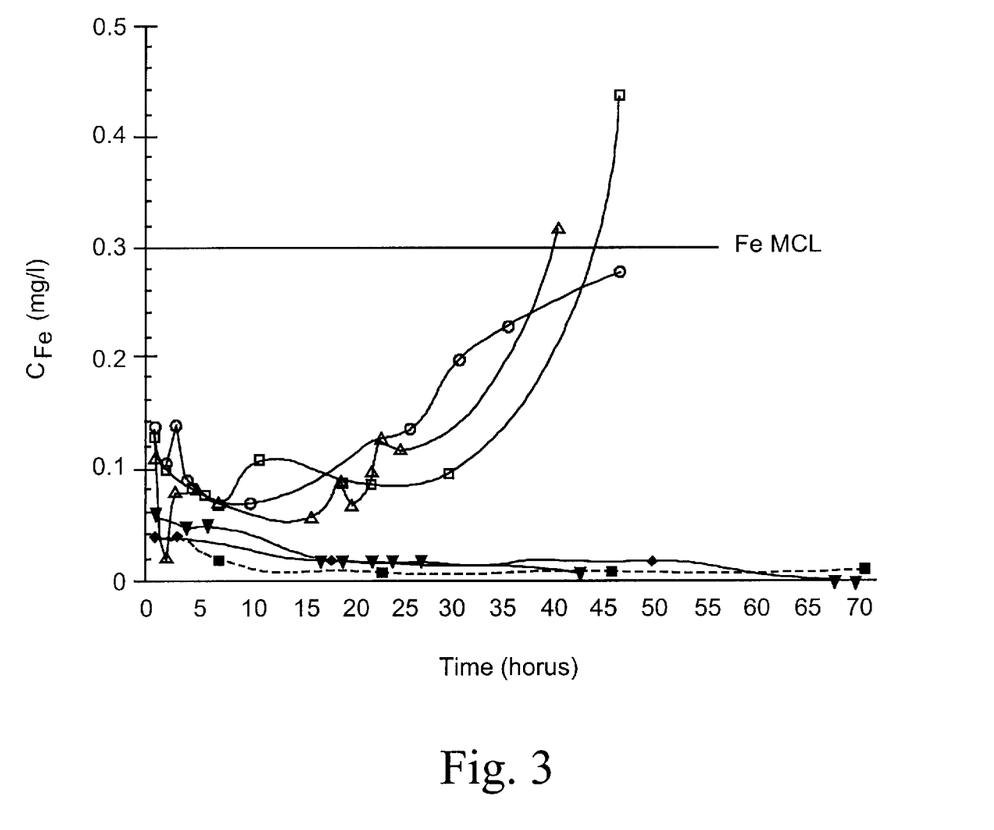
FIG. 3 shows the results of biological iron removal according to the invention compared with those obtained according to physico-chemical iron removal.

FIG. 3 shows the evolution of the concentration in ferrous iron ($CFe^{2+}$) of water treated in different plants as a function of time (Tps) of treatment in hours. The curves (□, ○, △) represent the results obtained on an existing iron removal plant, operating entirely on the physico-chemical principle of chlorine oxidation, followed by filtration over manganese greensand. The curves (□, □, □) showing the results obtained on a pilot plant for biological iron removal, functioning according to the invention, were tested in parallel. The results, shown for three filtration cycles speak for themselves and emphasise all the interest of this type of biological treatment which demonstrates a consistent low residual concentration of iron whereas for the existing physico-chemical process, this rises with the hours of utilisation of the plant.

Also, the process according to the invention, on a biological manganese removal filter, was tested on a plant operating at a filtration speed of 30 m/hr and the table below summarises the excellent results obtained.

| PARAMETERS | RAW WATER | TREATED WATER |
|---|---|---|
| pH | 7.65 | 7.65 |
| Mn (mg/l) | 0.7 | <0.02 |

Other modifications known to those skilled in the art are also within the scope of the invention.

What is claimed is:

1. Method for elimination by biological route of metallic elements present in the ionized state in water devoid of dissolved oxygen, in which the water to be treated is partially oxygenated by a specific aeration carried out before percolation through a biofilter reactor with a bacteria-supporting bed of filtering material, characterised in that it comprises:

a measurement stage for at least one parameter constituted by the oxidation-reduction potential (Eh) of the aerated water before passage into the biofilter;

a transmission stage of measurement signals to a computer and comparison with the signal representative of the value of at least one parameter measured for at least one lower limit of this parameter determined in function of the measurement carried out in a second stage of measurement of a second parameter representative of the pH and a possible stage for correction of the air flow by control by a unit (3, 10, 11) for adjusting the air flow by a signal determined by the computer in function of the two preceding stages.

2. Method according to claim 1, characterised in that it further comprises a stage for measuring the second parameter constituted by the pH of the aerated water before passage into the biofilter, and a stage of comparison with a lower and upper limit of the first parameter whose lower and upper limits are determined in function of the measurement of the second parameter.

3. Method according to claim 1, characterised in that it comprises a stage for compensation of a fault in the adjustment of the air flow by the first parameter by means of a system of complementary regulation using at least one signal provided by measurement means (12) of the residual content of oxygen dissolved in the treated water.

4. Method according to claim 1, characterised in that the compensation stage uses a second signal provided by measurement (13) of the pH of the treated water simultaneously with that of the dissolved oxygen.

5. Method according to claim 2, characterised in that it comprises an adjustment stage of the pH of the filtered water through injection of an alkaline solution (19) into the water to be treated, if the signal provided by the measurement means (13) of the pH representative of the pH value of the treated water is lower than an assigned lower value, said injection being limited by an assigned set upper value for the pH.

6. Method according to claim 1, characterised in that it comprises a stage for verifying the efficiency of the treatment by continuous measurement of the content of residual dissolved iron and the oxidation-reduction potential of the filtered water, with an alarm being set off in the event of anomaly.

7. Utilisation of the method according to claim 2, characterised in that the method is used in a biofilter with a ferro-bacteria supporting bed of filtering material.

8. Utilisation of the method according to claim 1, characterised in that the method is used in a biofilter with a mangano-bacteria supporting bed of filtering material.

9. Utilisation of the method according to claim 1, characterised in that the method is used in a biofilter with an autotrophic—bacteria supporting bed of filtering material.

10. Utilisation of the method according to claim 2, characterised in that the method is used in a first biofilter with a ferro-bacteria supporting bed of filtering material, and then the treated water exiting from this first biofilter is used according to the method of claim 1 in a second biofilter with a mangano-bacteria supporting bed of filtering material.

11. Device for treating waters devoid of dissolved oxygen, characterised in that it comprises an aeration chamber (4) into which the raw water and injected air are brought, the flow of the latter being controlled by a valve (3) allowing controlled aeration under pressure, and whose exit is linked to a biofilter reactor provided with an outlet (7), and with a porous ferro-bacteria supporting bed through which the water to be treated percolates, first measurement means (8) of the pH and second measurement means (9) of the oxidation-reduction potential (Eh) of the aerated water, set between the aeration chamber and the filter, the calculating units (10) taking into account the signals delivered by the first and second measurement means to send a command signal to a means for regulation of the air flow (11, 16) acting on the valve (3) to allow regulation in function of a lower limit and an upper limit for the potential Eh, determined for a given pH value.

12. Device according to claim 11, characterised in that it comprises means (13) for measuring the pH and means (12) for measuring the dissolved oxygen at the outlet from the filter (5) and units for computing (14) and regulating (16) the air flow to allow complementary adjustment of the method.

13. Device according to claim 11, characterised in that it comprises a station for regulating the pH comprising a reservoir (20) of an alkaline solution (19) controlled by an electro-valve or feed pump which is monitored by the signal worked out by a regulation unit (17) and allowing the adjustment of the pH in function of the signal delivered by the measurement means (13) of the pH set at the outlet from the biofilter reactor to the regulation unit (17).

14. Device according to claim 11, characterised in that it comprises means (21, 22) for measuring the oxidation-reduction potential of the residual iron in the filtered water, set at the outlet from the filter and allowing evaluation of the efficiency of the device.

15. Device for treating waters devoid of dissolved oxygen according to claim 11, characterised in that the outlet from the ferro-bacteria biofilter reactor is linked to a second aeration chamber (4') into which is brought the water treated ny the ferro-bacteria biofilter reactor and air injected by a second valve (3'), the exit from the aeration chamber (4') being linked to a second biofilter reactor (5') provided with an outlet (7') and having a porous mangano-bacteria supporting bed through which the treated water from the ferro-bacteria biofilter percolates and third measurement means (9') of the oxidation-reduction potential (Eh) at the exit from the second aeration chamber, a calculation unit (10') taking into account the signal delivered by the third measurement means to send a command signal to a regulation means (11') acting on the second valve (3') to allow adjustment of the air flow in function of a given lower limit.

16. Device according to claim 11, characterised in that the filtering bed is constituted of siliceous sand of an effective size comprised between 1 and 3 mm.

17. Device according to claim 11, characterised in that the filtering bed is constituted of a filtering material, called "Biolite".

* * * * *